US008657431B2

(12) United States Patent
Iftime et al.

(10) Patent No.: US 8,657,431 B2
(45) Date of Patent: *Feb. 25, 2014

(54) PHASE CHANGE MAGNETIC INK COMPRISING CARBON COATED MAGNETIC NANOPARTICLES AND PROCESS FOR PREPARING SAME

(75) Inventors: Gabriel Iftime, Mississauga (CA); C. Geoffrey Allen, Waterdown (CA); Peter G. Odell, Mississauga (CA); Richard P. N. Veregin, Mississauga (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/049,936

(22) Filed: Mar. 17, 2011

(65) Prior Publication Data

US 2012/0236088 A1 Sep. 20, 2012

(51) Int. Cl.
B41J 2/01 (2006.01)
(52) U.S. Cl.
USPC ............. 347/99; 347/88; 347/95; 347/100
(58) Field of Classification Search
USPC .............. 347/88, 95–100; 523/160, 161; 106/31.32, 31.64; 252/62.54, 62.55, 252/62.51 R
See application file for complete search history.

(56) References Cited

U.S. PATENT DOCUMENTS

| | | | |
|---|---|---|---|
| 4,463,034 A | 7/1984 | Tokunaga et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,195,430 A | 3/1993 | Rise | |
| 5,372,852 A | 12/1994 | Titterington et al. | |
| 5,389,958 A | 2/1995 | Bui et al. | |
| 5,597,856 A | 1/1997 | Yu et al. | |
| 5,667,924 A | 9/1997 | Ziolo | |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,918 A | 10/1998 | Titterington et al. | |
| 5,830,942 A | 11/1998 | King et al. | |
| 5,866,637 A | 2/1999 | Lorenz | |
| 5,919,839 A | 7/1999 | Titterington et al. | |
| 6,174,937 B1 | 1/2001 | Banning et al. | |
| 6,255,432 B1 | 7/2001 | Evans et al. | |
| 6,262,129 B1* | 7/2001 | Murray et al. ................ | 516/33 |
| 6,309,453 B1 | 10/2001 | Banning et al. | |
| 6,767,396 B2 | 7/2004 | Mcelligott et al. | |
| 6,860,930 B2 | 3/2005 | Wu et al. | |
| 7,563,489 B2* | 7/2009 | Carlini et al. ................ | 427/466 |
| 7,625,956 B2* | 12/2009 | Odell et al. .................. | 522/173 |
| 7,749,300 B2 | 7/2010 | Chretien et al. | |
| 7,789,935 B2 | 9/2010 | Chretien et al. | |
| 7,973,186 B1 | 7/2011 | Goredema et al. | |
| 8,303,838 B2* | 11/2012 | Iftime et al. ................ | 252/62.54 |
| 8,313,666 B2* | 11/2012 | Iftime et al. ................ | 252/62.54 |
| 8,360,546 B2* | 1/2013 | Iftime et al. .................... | 347/20 |
| 2004/0000254 A1* | 1/2004 | McElligott et al. ........ | 106/31.65 |
| 2008/0220231 A1* | 9/2008 | Suetsuna et al. ............ | 428/216 |
| 2009/0321676 A1* | 12/2009 | Breton et al. .............. | 252/62.53 |
| 2010/0028537 A1 | 2/2010 | Goredema et al. | |
| 2010/0060539 A1* | 3/2010 | Suetsuna et al. ............ | 343/787 |
| 2010/0140916 A1* | 6/2010 | Firth et al. ................... | 283/82 |
| 2010/0292467 A1 | 11/2010 | Goredema et al. | |
| 2011/0048171 A1 | 3/2011 | Enright et al. | |
| 2011/0059233 A1 | 3/2011 | Liu et al. | |
| 2011/0151375 A1 | 6/2011 | Fan et al. | |
| 2012/0012778 A1* | 1/2012 | Tilley et al. ................ | 252/62.55 |
| 2012/0162330 A1* | 6/2012 | Iftime et al. .................... | 347/88 |
| 2012/0235074 A1* | 9/2012 | Iftime et al. ................ | 252/62.53 |
| 2012/0235075 A1* | 9/2012 | Iftime et al. ................ | 252/62.54 |
| 2012/0235077 A1* | 9/2012 | Iftime et al. ................ | 252/62.54 |
| 2012/0235078 A1* | 9/2012 | Iftime et al. ................ | 252/62.54 |
| 2012/0235079 A1* | 9/2012 | Iftime et al. ................ | 252/62.54 |
| 2012/0236064 A1* | 9/2012 | Iftime et al. .................... | 347/20 |
| 2012/0236065 A1* | 9/2012 | Iftime et al. .................... | 347/20 |
| 2012/0236089 A1* | 9/2012 | Iftime et al. .................... | 347/88 |
| 2012/0236090 A1* | 9/2012 | Iftime et al. .................... | 347/88 |
| 2012/0236091 A1* | 9/2012 | Iftime et al. .................... | 347/88 |
| 2012/0236092 A1* | 9/2012 | Iftime et al. .................... | 347/88 |

FOREIGN PATENT DOCUMENTS

| | | |
|---|---|---|
| GB | 2238792 | 6/1991 |
| GB | 2294939 | 5/1996 |
| GB | 2305928 | 4/1997 |
| WO | WO 94/14902 | 7/1994 |
| WO | WO 95/04760 | 2/1995 |

OTHER PUBLICATIONS

Gabriel Iftime, et al., U.S. Appl. No. 13/049,937, filed Mar. 17, 2011, "Solvent Based Magnetic Ink Comprising Carbon Coated Magnetic Nanoparticles and Process for Preparing Same," not yet published, 32 pages.
Gabriel Iftime, et al., U.S. Appl. No. 13/050,403, filed Mar. 17, 2011, "Magnetic Curable Inks," not yet published, 63 pages.
Gabriel Iftime, et al., U.S. Appl. No. 13/049,950, filed Mar. 17, 2011, "Phase Change Magnetic Ink Comprising Surfactant Coated Magnetic Nanoparticles and Process for Preparing Same," not yet published, 34 pages.
Gabriel Iftime, et al., U.S. Appl. No. 13/049,942, filed Mar. 17, 2011, "Phase Change Magnetic Ink Comprising Coated Magnetic Nanoparticles and Process for Preparing Same," not yet published, 41 pages.
Gabriel Iftime, et al., U.S. Appl. No. 13/049,954, filed Mar. 17, 2011, "Phase Change Magnetic Ink Comprising Polymer Coated Magnetic Nanoparticles and Process for Preparing Same," not yet published, 36 pages.
Gabriel Iftime, et al., U.S. Appl. No. 13/049,945, filed Mar. 17, 2011, "Phase Change Magnetic Ink Comprising Inorganic Oxide Coated Magnetic Nanoparticles and Process for Preparing Same," not yet published, 32 pages.

(Continued)

Primary Examiner — Matthew Luu
Assistant Examiner — Rut Patel
(74) Attorney, Agent, or Firm — Marylou J. Lavoie

(57) ABSTRACT

A phase change magnetic ink including a phase change ink carrier; an optional colorant; an optional dispersant; an optional synergist; an optional antioxidant; and a carbon coated magnetic nanoparticle comprising a magnetic core and a carbon shell disposed thereover.

19 Claims, No Drawings

(56) References Cited

OTHER PUBLICATIONS

Gabriel Iftime, et al., U.S. Appl. No. 13/050,268, filed Mar. 17, 2011, "Curable Inks Comprising Inorganic Oxide Coated Magnetic Nanoparticles," not yet published, 39 pages.

Gabriel Iftime, et al., U.S. Appl. No. 13/050,383, filed Mar. 17, 2011, "Curable Inks Comprising Polymer Coated Magnetic Nanoparticles," not yet published, 43 pages.

Gabriel Iftime, et al., U.S. Appl. No. 13/050,423, filed Mar. 17, 2011, "Curable Inks Comprising Coated Magnetic Nanoparticles," not yet published, 44 pages.

Gabriel Iftime, et al., U.S. Appl. No. 13/050,341, filed Mar. 17, 2011, "Curable Inks Comprising Surfactant Coated Magnetic Nanoparticles," not yet published, 41 pages.

Gabriel Iftime, et al., U.S. Appl. No. 13/050,223, filed Mar. 17, 2011, "Solvent-Based Inks Comprising Coated Magnetic Nanoparticles," not yet published, 37 pages.

Gabriel Iftime, et al., U.S. Appl. No. 13/050,152, filed Mar. 17, 2011, "Solvent-Based Inks Comprising Coated Magnetic Nanoparticles," not yet published, 32 pages.

Burke et al., Magnetic Nanocomposites: Preparation and Characterization of Polymer-Coated Iron Nanoparticles, Chemistry of Materials, 2002, 14, pp. 4752-4761.

Cullity et al., Fine Particles and Thin Films, Introduction to Magnetic Materials, IEEE Press (Wiley), $2^{nd}$ Ed., 2009, Chapter 11, pp. 359-364.

Lu et al., Magnetic Nanoparticle: Synthesis, Protection, Functionalization, and Application, Anew. Chem. Int. Ed. 2007, 46, pp. 1222-1244.

Ou et al., Characteristics of graphene-layer encapsulated nanoparticles fabricated using laser ablation method, Diamond and Related Materials, vol. 17, (2008) Issues 4-5, available online Nov. 1, 2007, pp. 664-668.

An et al., A Novel Method for Preparation of Carbon Coating Iron Nanoparticles, Advanced Materials Research, vol. 92 (2010), available online Jan. 12, 2010, pp. 7-11.

Guo et al., Iron Nanoparticles: Synthesis and applications in surface enhanced Raman scattering and electrocatalysis, Phys. Chem. Chem. Phys. 3, (2001) Apr. 3, 2001, pp. 1661-1665.

Sang-Jae Park et al., Synthesis and Magnetic Studies of Uniform Iron Nanorods and Nanospheres, J. Am. Chem. Soc., Aug. 18, 2000, pp. 8581-8582.

C. B. Murray et al., Monodisperse 3d Transition Metal (Co, Ni, Fe) Nanoparticles and Their Assembly Into Nanoparticle Superlattices, MRS Bulletin, Dec. 2001, pp. 985-991.

Girija S. Chaubey et al., Synthesis and Stabilization of FeCo Nanoparticles, J. Am. Chem. Soc., May 12, 2007, pp. 7214,7215.

B. Martorana et al., Preparation of Plastic Ferromagnetic Composite Materials for Magnetic Encoders, Sensors and Actuators, Apr. 24, 2006, pp. 176-179.

\* cited by examiner

PHASE CHANGE MAGNETIC INK COMPRISING CARBON COATED MAGNETIC NANOPARTICLES AND PROCESS FOR PREPARING SAME

RELATED APPLICATIONS

Commonly assigned U.S. patent application Ser. No. 13/049,937, entitled "Solvent Based Magnetic Ink Comprising Carbon Coated Magnetic Nanoparticles And Process For Preparing Same"), filed concurrently herewith, is hereby incorporated by reference herein in its entirety.

Commonly assigned U.S. patent application Ser. No. 13/050,403, entitled "Magnetic Curable Inks," filed concurrently herewith, is hereby incorporated by reference herein in its entirety.

Commonly assigned U.S. patent application Ser. No. 13/049,950, entitled "Phase Change Magnetic Ink Comprising Surfactant Coated Magnetic Nanoparticles And Process For Preparing Same"), filed concurrently herewith, is hereby incorporated by reference herein in its entirety.

Commonly assigned U.S. patent application Ser. No. 13/049,942, entitled "Phase Change Magnetic Ink Comprising Coated Magnetic Nanoparticles And Process For Preparing Same"), filed concurrently herewith, is hereby incorporated by reference herein in its entirety.

Commonly assigned U.S. patent application Ser. No. 13/049,954, entitled "Phase Change Magnetic Ink Comprising Polymer Coated Magnetic Nanoparticles And Process For Preparing Same"), filed concurrently herewith, is hereby incorporated by reference herein in its entirety.

Commonly assigned U.S. patent application Ser. No. 13/049,945, entitled "Phase Change Magnetic Ink Comprising Inorganic Oxide Coated Magnetic Nanoparticles And Process For Preparing Same"), filed concurrently herewith, is hereby incorporated by reference herein in its entirety.

Commonly assigned U.S. patent application Ser. No. 13/050,268, entitled "Curable Inks Comprising Inorganic Oxide-Coated Magnetic Nanoparticles"), filed concurrently herewith, is hereby incorporated by reference herein in its entirety.

Commonly assigned U.S. patent application Ser. No. 13/050,383, entitled "Curable Inks Comprising Polymer-Coated Magnetic Nanoparticles"), filed concurrently herewith, is hereby incorporated by reference herein in its entirety.

Commonly assigned U.S. patent application Ser. No. 13/050,423, entitled "Curable Inks Comprising Coated Magnetic Nanoparticles"), filed concurrently herewith, is hereby incorporated by reference herein in its entirety.

Commonly assigned U.S. patent application Ser. No. 13/050,341, entitled "Curable Inks Comprising Surfactant-Coated Magnetic Nanoparticles"), filed concurrently herewith, is hereby incorporated by reference herein in its entirety.

Commonly assigned U.S. patent application Ser. No. 13/050,223, entitled "Solvent-Based Inks Comprising Coated Magnetic Nanoparticles"), filed concurrently herewith, is hereby incorporated by reference herein in its entirety.

Commonly assigned U.S. patent application Ser. No. 13/050,152, entitled "Solvent-Based Inks Comprising Coated Magnetic Nanoparticles"), filed concurrently herewith, is hereby incorporated by reference herein in its entirety.

BACKGROUND

Disclosed herein is a phase change magnetic ink including carbon coated magnetic nanoparticles and a process for preparing a phase change magnetic ink.

Non-digital inks and printing elements suitable for MICR printing are known. The two most commonly known technologies are ribbon based thermal printing systems and offset technology. For example, U.S. Pat. No. 4,463,034, which is hereby incorporated by reference herein in its entirety, discloses a heat sensitive magnetic transfer element for printing a magnetic image to be recognized by a magnetic ink character reader, comprising a heat resistant foundation and a heat sensitive imaging layer. The imaging layer is made of a ferromagnetic substance dispersed in a wax and is transferred onto a receiving paper in the form of magnetic image by a thermal printer which uses a ribbon.

U.S. Pat. No. 5,866,637, which is hereby incorporated by reference herein in its entirety, discloses formulations and ribbons which employ wax, binder resin and organic molecule based magnets which are to be employed for use with a thermal printer which employs a ribbon.

MICR ink suitable for offset printing using a numbering box are typically thick, highly concentrated pastes consisting, for example, of over about 60% magnetic metal oxides dispersed in a base containing soy based varnishes. Such inks are commercially available, such as from Heath Custom Press (Auburn, Wash.).

Digital water-based ink-jet inks composition for MICR applications using a metal oxide based ferromagnetic particles of a particle size of less than 500 microns are disclosed in U.S. Pat. No. 6,767,396 (M. J. McElligott, et al.) Water based inks are commercially available from Diversified Nano Corporation (San Diego, Calif.).

The inks described herein are suitable for use in various applications, including Magnetic Ink Character Recognition (MICR) applications. In addition, the printed inks may be used for decoration purposes, even if the resulting inks do not sufficiently exhibit coercivity and remanence suitable for use in MICR applications. The inks may also be used for security printing applications.

MICR ink contains a magnetic pigment or a magnetic component in an amount sufficient to generate a magnetic signal strong enough to be readable via a MICR reader. Generally, the ink is used to print all or a portion of a document, such as checks, bonds, security cards, etc.

MICR inks or toners are made by dispersing magnetic particles into an ink base. There are numerous challenges in developing a MICR ink jet ink. For example, most ink jet printers limit considerably the particle size of any particulate components of the ink, due to the very small size of the ink jet print head nozzle that expels the ink onto the substrate. The size of the ink jet head nozzle openings are generally on the order of about 40 to 50 microns, but can be less than 10 microns in diameter. This small nozzle size requires that the particulate matter contained in an ink jet ink composition must be of a small enough size to avoid nozzle clogging problems. Even when the particle size is smaller than the nozzle size, the particles can still agglomerate or cluster together to the extent that the size of the agglomerate exceeds the size of the nozzle opening, resulting in nozzle blockage. Additionally, particulate matter may be deposited in the nozzle during printing, thereby forming a crust that results in nozzle blockage and/or imperfect flow parameters.

Further, a MICR ink jet ink must be fluid at jetting temperature and not dry. An increase in pigment size can cause a corresponding increase in ink density thereby making it difficult to maintain the pigments in suspension or dispersion within a liquid ink composition.

MICR inks contain a magnetic material that provides the required magnetic properties. The magnetic material must retain a sufficient charge so that the printed characters retain their readable characteristic and are easily detected by the detection device or reader. The magnetic charge retained by a magnetic material is known as "remanence." The magnetic material must exhibit sufficient remanence once exposed to a source of magnetization in order to generate a MICR-readable signal and have the capability to retain the same over time. Generally, an acceptable level of charge, as set by industry standards, is between 50 and 200 Signal Level Units, with 100 being the nominal value, which is defined from a standard developed by the American National Standards Institute. A lesser signal may not be detected by the MICR reading device, and a greater signal may not give an accurate reading. Because the documents being read employ the MICR printed characters as a means of authenticating or validating the presented documents, it is important that the MICR characters or other indicia be accurately read without skipping or misreading characters. Therefore, for purposes of MICR, remanence is preferably a minimum of 20 emu/g (electromagnetic unit/gram). A higher remanence value corresponds to a stronger readable signal.

Remanence tends to increase as a function of particle size and of the magnetic pigment coating. Accordingly, when the magnetic particle size decreases, the magnetic particles to experience a corresponding reduction in remanence. Achieving sufficient signal strength thus becomes increasingly difficult as the magnetic particle size diminishes and the practical limits on percent content of magnetic particles in the ink composition are reached. A higher remanence value will require less total percent magnetic particles in the ink formula, improve suspension properties, and reduce the likelihood of settling as compared to an ink formula with higher percent magnetic particle content.

Additionally, MICR ink jet inks must exhibit low viscosity, typically on the order of less than 15 centipoise (cP) or about 2 to 8 cP at jetting temperature (jetting temperature ranging from about 25° C. to about 140° C.) in order to function properly in both drop-on-demand type printing equipment, such as piezoelectric printers, and continuous type printing apparatus. The use of low viscosity fluids, however, adds to the challenge of successfully incorporating magnetic particles into an ink dispersion because particle settling will increase in a less viscous fluid as compared to a more viscous fluid.

U.S. Patent Publication Number 2009/0321676A1, which is hereby incorporated by reference herein in its entirety, describes in the Abstract thereof an ink including stabilized magnetic single-crystal nanoparticles, wherein the value of the magnetic anisotropy of the magnetic nanoparticles is greater than or equal to $2 \times 10^4$ J/m$^3$. The magnetic nanoparticle may be a ferromagnetic nanoparticle, such as FePt. The ink includes a magnetic material that minimizes the size of the particle, resulting in excellent magnetic pigment dispersion stability, particularly in non-aqueous ink jet inks. The smaller sized magnetic particles of the ink also maintain excellent magnetic properties, thereby reducing the amount of magnetic particle loading required in the ink.

Magnetic metal nanoparticles are desired for MICR inks because magnetic metal nanoparticles have the potential to provide high magnetic remanence, a key property for enabling MICR ink. However, in many cases, unprotected or surfactant protected magnetic metal nanoparticles are pyrophoric and thus constitute a safety hazard. Large scale production of phase change inks with such particles is difficult because air and water need to be completely removed when handling these highly oxidizable particles. In addition, the ink preparation process is particularly challenging with magnetic pigments because inorganic magnetic particles can be incompatible with certain organic base ink components.

As noted, magnetic metal nanoparticles are pyrophoric and can be extremely air and water sensitive. Magnetic metal nanoparticles, such as iron nanoparticles of a certain size, typically in the order of a few tens of nanometers or less, have been known to spontaneously ignite when contacted with air. Iron nanoparticles packaged in vacuum sealed bags have been known to become extremely hot even when opened in inert atmosphere, such as in an argon environment, and have been known to oxidize quickly by the traces of oxygen and water in the argon gas, even when the oxygen and water was present at only about 5 parts per million each, and to lose most of their magnetic remanence property. Large scale production of inks with such particles is problematic because air and water need to be completely removed when handling these materials.

Water-based MICR ink is commercially available. Water-based MICR ink requires special print-heads to be used with certain ink jet printing technology such as phase change or solid ink technology. There is further a concern with respect to possible incompatibility when operating both solid ink and water-based ink in the same printer. Issues such as water evaporation due to the proximity to the solid ink heated ink tanks, rust, and high humidity sensitivity of the solid ink are issues which must be addressed for implementation of a water-based MICR ink in a solid ink apparatus.

Currently, there are no commercially available phase change or solid ink MICR inks. There is a need for a MICR ink suitable for use in phase change or solid ink jet printing. There are numerous challenges in developing a MICR ink suitable for use in phase change or solid ink jet printing. MICR phase change ink processes are particularly challenging with magnetic pigments because (1) inorganic magnetic particles are incompatible with the organic base components of phase change ink carriers, and (2) magnetic pigments are much denser than typical organic pigments (the density of iron is about 8 g/cm$^3$, for example) which can result in unfavorable particle settling, and (3) uncoated metal magnetic nanoparticles are pyrophoric thus presenting a safety issue.

Currently available MICR inks and methods for preparing MICR inks are suitable for their intended purposes. However, a need remains for MICR ink jet inks that have reduced magnetic material particle size, improved magnetic pigment dispersion and dispersion stability along with the ability to maintain excellent magnetic properties at a reduced particle loading. Further, a need remains for MICR phase change inks that are suitable for use in phase change ink jet printing technology. Further, a need remains for a process for preparing a MICR ink that is simplified, environmentally safe, capable of producing a highly dispersible magnetic ink having stable particle dispersion, allowing for safe and cost effective processing of metal nanoparticles.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change magnetic ink comprising a phase change ink carrier; an optional colorant; an optional dispersant; an optional synergist; an optional antioxidant; and a carbon coated magnetic nanoparticle comprising a magnetic core and a carbon shell disposed thereover.

Also described is a process for preparing a phase change magnetic ink comprising combining a phase change ink carrier, an optional colorant, an optional dispersant, an optional synergist, an optional antioxidant, and a carbon coated magnetic nanoparticle comprising a magnetic core and a carbon shell disposed thereover; heating to provide a phase change magnetic ink including the metal nanoparticles; optionally, filtering the phase change magnetic ink while in a liquid state, and cooling the phase change magnetic ink to a solid state.

Also described is a process which comprises (1) incorporating into an ink jet printing apparatus a phase change magnetic ink comprising a phase change ink carrier, an optional colorant, an optional dispersant, an optional synergist, an optional antioxidant; and a carbon coated magnetic nanoparticle comprising a magnetic core and a carbon shell disposed thereover; (2) melting the ink; and (3) causing droplets of the melted ink to be ejected in an imagewise pattern onto a substrate.

DETAILED DESCRIPTION

A phase change magnetic ink is described comprising a phase change ink carrier; an optional colorant; an optional dispersant; an optional synergist; an optional antioxidant; and a carbon coated magnetic nanoparticle comprising a magnetic core and a carbon shell disposed thereover. The carbon coating provides an effective barrier against oxygen and as a result provide significant stability against oxidation to the magnetic core of the nanoparticles. These magnetic nanoparticles may be handled in air or under regular inert atmosphere conditions with reduced risk of fire.

The phase change magnetic inks herein can be used for any suitable or desired purpose. In embodiments, the inks herein are used as MICR inks. The inks made according to the present disclosure may be used for MICR applications as well as, for example, in magnetic encoding or in security printing applications, among others. In specific embodiments, the inks herein are used as MICR inks for automated check processing, security printing for document authentication, such as by detecting the magnetic particles in prints which otherwise appear identical. The MICR inks can be used alone or in combination with other inks or printing materials.

The phase change magnetic inks herein can be prepared by any suitable or desired process. In embodiments, a process for preparing a phase change magnetic ink comprises combining a phase change ink carrier, an optional colorant, an optional dispersant, an optional synergist, an optional antioxidant, and a carbon coated magnetic nanoparticle comprising a magnetic core and a carbon shell disposed thereover; heating to provide a phase change magnetic ink including the metal nanoparticles; and optionally, filtering the phase change magnetic ink while in a liquid state, and cooling the phase change magnetic ink to a solid state. Additional ink carrier materials or ink components may be added to the ink at a later time, after the initial preparation of a concentrated dispersion containing carbon-coated magnetic nanoparticles.

Heating the combined phase change ink carrier, optional colorant, optional dispersant, optional synergist, optional antioxidant, and carbon coated magnetic nanoparticle comprising a magnetic core and a carbon shell disposed thereover, can comprise heating to any temperature sufficient to provide a melt composition for the selected materials. In embodiments, heating comprises heating to a temperature of about 60° C. to about 180° C., or about 80° C. to about 160° C., or about 100° C. to about 140° C.

If desired, one or more of the phase change ink carrier, optional dispersant, optional synergist, optional antioxidant, and optional colorant can be combined and heated, followed by addition of any additional additives or non-included materials, to provide a first composition which first composition can then be combined with the carbon coated magnetic nanoparticles, followed by further processing, as suitable or desired, to form the phase change magnetic ink composition.

Optionally, the phase change magnetic ink can be filtered. In embodiments, the phase change magnetic ink can be filtered while in a liquid state by any suitable or desired method. In embodiments, the phase change magnetic ink is filtered using a nylon cloth filter. In embodiments, the phase change magnetic ink is optionally filtered through a 1 micrometer nylon filter or a 5 micrometer nylon filter in a 70 millimeter Mott filtration assembly (available from Mott Corporation, Farmington, Conn.) at 135° C.

Carbon Coated Magnetic Material.

The carbon coated metal magnetic nanoparticles herein are desirably in the nanometer size range. For example, in embodiments, the carbon coated metal nanoparticles have an average particle size (such as volume average particle diameter or longest dimension) total size including core and shell of from about 3 to about 500 nanometers (nm), or about 3 to about 300 nm, or about 3 to about 30 nm, or about 10 to about 500 nm, or about 10 to about 300 nm, or about 10 to about 100 nm, or about 10 to about 50 nm, or about 2 to about 20 nm, or about 25 nm. Herein, "average" particle size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy or from Dynamic Light Scattering measurements.

In embodiments, two types of magnetic metal based phase change inks can be obtained by the process herein, depending on the particle size and shape: ferromagnetic phase change ink and superparamagnetic phase change ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic phase change inks. Superparamagnetic inks are also magnetized in the presence of a magnetic field but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

As described above, the metal nanoparticles herein can be ferromagnetic or superparamagnetic. Superparamagnetic nanoparticles have a remanent magnetization of zero after being magnetized by a magnet. Ferromagnetic nanoparticles have a remanent magnetization of greater than zero after being magnetized by a magnet; that is, ferromagnetic nanoparticles maintain a fraction of the magnetization induced by the magnet. The superparamagnetic or ferromagnetic property of a nanoparticle is generally a function of several factors including size, shape, material selection, and temperature. For a given material, at a given temperature, the coercivity (that is, ferromagnetic behavior) is maximized at a critical particle size corresponding to the transition from multidomain to single domain structure. This critical size is referred to as the critical magnetic domain size (Dc, spherical). In the single domain range, there is a sharp decrease of the coercivity and remanent magnetization when decreasing the particle size, due to thermal relaxation. Further decrease of the particle size results in complete loss of induced magnetization because the thermal effect becomes dominant and is sufficiently strong to demagnetize previously magnetically saturated nanoparticles. Superparamagnetic nanoparticles have zero remanence and coercivity. Particles of a size of about and above the Dc are ferromagnetic. For example, at room temperature, the Dc for iron is about 15 nanometers, for fcc cobalt is about 7 nanometers, and for nickel about 55 nanometers. Further, iron nanoparticles having a particle size of 3, 8, and 13 nanometers are superparamagnetic while iron nanoparticles having a particle size of 18 to 40 nanometers are ferromagnetic. For alloys, the Dc value may change depending on the materials. For further detail, see Burke, et al., Chemistry of Materials, pages 4752-4761, 2002. For still further detail, see U.S. Publication 20090321676, (Breton, et al.), which is hereby incorporated by reference herein in its entirety; B. D. Cullity and C. D. Graham, Introduction to Magnetic Materials, IEEE Press (Wiley), 2nd Ed., 2009, Chapter 11, Fine Particles and Thin Films, pages 359-364; Lu et al., Angew. Chem. Int. Ed. 2007, 46, pages 1222-444, Magnetic Nanoparticles: Synthesis, Protection, Functionalization and Application, each of which are hereby incorporated by reference herein in their entireties.

Any suitable or desired metal can be used for the nanoparticle core in the present process. In embodiments, the magnetic nanoparticles comprise a core selected from the group consisting of Fe, Mn, Co, Ni, and mixtures and alloys thereof. In other embodiments, the magnetic nanoparticles comprise a core selected from the group consisting of Fe, Mn, Co, FePt, Fe, Co, CoPt, MnAl, MnBi, and mixtures and alloys thereof. In certain specific embodiments, the metal nanoparticles comprise at least one of Fe, Mn, and Co.

In further embodiments, the magnetic nanoparticles comprise a bimetallic or trimetallic core.

The carbon coated metal nanoparticles are typically produced by a laser evaporation process. For example, graphite layer coated nickel nanoparticles having diameters of between about 3 to about 10 nanometers can be produced by laser ablation techniques. For further detail, see Q. Ou, T. Tanaka, M. Mesko, A. Ogino, M. Nagatsu, Diamond and Related Materials, Vol. 17, Issues 4-5, pages 664-8, 2008. Alternately, carbon coated iron nanoparticles can be prepared by carbonizing polyvinyl alcohol using iron as a catalyst in hydrogen flow. For further detail, see Yu Liang An, et al., Advanced Materials Research, 92, 7, 2010. Alternatively, carbon coated ion nanoparticles can be prepared by using an annealing procedure. The procedure induces carbonization of a stabilizing organic material—3-(N,N-Dimethyllaurylammonio)propane sulfonate—which can be used to stabilize the pre-formed iron nanoparticles. The process can be performed under flow of hydrogen to ensure carbonization process. The carbon shell was found to effectively protect the iron core from oxidation in acidic solutions. For further detail, see Z. Guo, L. L. Henry, E. J. Podlaha, ECS Transactions, 1 (12) 63-69, 2006). Carbon materials may be selected from the group consisting of amorphous carbon, glassy carbon, graphite, carbon nanofoam, diamond, and the like. In embodiments, the magnetic nanoparticles comprise a carbon shell comprising amorphous carbon, glassy carbon, graphite, and combinations thereof.

Carbon coated metal nanoparticles can also be obtained commercially, such as from Nanoshel Corporation (Wilmington, Del., USA).

In embodiments, the magnetic nanoparticles comprise a carbon shell having a thickness of from about 0.2 nanometers (nm) to about 100 nm, or from about 0.5 nm to about 50 nm, or from about 1 nm to about 20 nm.

The magnetic nanoparticles may be in any shape. Exemplary shapes of the magnetic nanoparticles can include, for example, without limitation, needle-shape, granular, globular, amorphous shapes, and the like. In embodiments, the ratio of the major to minor size axis of the single nanocrystal (D major/D minor) can be less than about 10:1, less than about 2:1, or less than about 3:2. In a specific embodiment, the magnetic core has a needle-like shape with an aspect ratio of about 3:2 to less than about 10:1.

The loading requirements of the magnetic nanoparticles in the ink may be any suitable or desired amount, in embodiments, from about 0.5 weight percent to about 30 weight percent, from about 5 weight percent to about 10 weight percent, or from about 6 weight percent to about 8 weight percent, although the amount can be outside of these ranges.

In embodiments, the magnetic nanoparticle can have a remanence of about 20 emu/g to about 100 emu/g, from about 30 emu/g to about 80 emu/g, or from about 50 emu/g to about 70 emu/g, although the amount can be outside of these ranges.

In embodiments, the coercivity of the magnetic nanoparticle can be about 200 Oersteds to about 50,000 Oersteds, about 1,000 Oersteds to about 40,000 Oersteds, or about 10,000 Oersteds to about 20,000 Oersteds, although the amount can be outside of these ranges.

In embodiments, the magnetic saturation moment may be, for example, about 20 emu/g to about 150 emu/g, about 30 emu/g to about 120 emu/g, or about 40 emu/g to about 80 emu/g, although the amount can be outside of these ranges.

Carrier Material.

The MICR phase change ink herein can include any desired or effective carrier composition. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

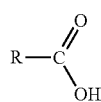

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. Nos. 4,889,560, 4,889,761, 5,194,638, 4,830,671, 5,372,852, 5,597,856, 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, and British Patent GB 2 294 939, British Patent GB 2 305 928, PCT Publication WO 94/14902, and PCT Publication WO 95/04760, the disclosures of each of which are totally incorporated herein by reference.

Mixtures of fatty amide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The carrier can be present in any suitable or desired amount. In embodiments, the ink carrier is present in the phase change ink in an amount of about 0.1 percent to no more than about 99 percent by weight of the ink.

Dispersant.

Dispersant may be optionally present in the ink formulation. The role of the dispersant is to further ensure improved dispersion stability of the coated magnetic nanoparticles by stabilizing interactions with the coating material. Suitable dispersants include, but are not limited to, oleic acid; trioctyl phosphine oxide (TOPO), hexyl phosphonic acid (HPA); polyvinylpyrrolidone (PVP), and combinations thereof. Suitable dispersants may also include beta-hydroxy carboxylic acids and their esters, sorbitol esters with long chain aliphatic carboxylic acids, polymeric compounds such as polyvinylpyrrolidone and derivatives, and Solsperse® polymeric dispersants and combinations thereof. Further examples of suitable dispersants may include Disperbyk® 108, Disperbyk® 116, (BYK), Borchi® GEN 911, Irgasperse® 2153 and 2155 (Lubrizol), acid and acid ester waxes from Clariant, for example Licowax® S. Suitable dispersants are also described in U.S. Patent Publication 2010/0292467, which is hereby incorporated by reference herein in its entirety. Further suitable dispersants are also described in U.S. patent application Ser. No. 12/641,564, which is hereby incorporated by reference herein in its entirety, and in U.S. patent application Ser. No. 12/891,619, which is hereby incorporated by reference herein in its entirety. Additional suitable dispersants include beta-hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), and combinations thereof. In embodiments, the dispersant is selected from the group consisting of oleic acid, oleyl amine, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

The dispersant can be present in any suitable or desired amount. In embodiments, the dispersant is present in the phase change ink in an amount of about 0.1 percent to about 10 percent by weight of the ink.

Synergist.

In embodiments, a synergist may also be included in the ink base. The synergist can be added at any suitable or desired time.

The synergist can be present in any suitable or desired amount. In embodiments, the synergist is present in the phase change ink in an amount of about 0.1 percent to about 10 percent by weight of the ink.

Any suitable or desired synergist can be employed. In embodiments, the synergist may be selected from Solsperse® 5000 or Solsperse® 22000, available from Lubrizol Corporation.

Colorant.

The phase change inks of the present disclosure can further contain a colorant compound. This optional colorant can be present in the ink in any desired or effective amount to obtain the desired color or hue, in embodiments from about 1 percent to about 20 percent by weight of the ink. The colorant can be any suitable or desired colorant including dyes, pigments, mixtures thereof, and the like. In embodiments, the colorant selected for the phase change magnetic inks herein is a pigment. In a specific embodiment, the colorant selected for the phase change magnetic inks herein is carbon black.

Further suitable colorants for use in the MICR ink according to the present disclosure include, without limitation, carbon black, lamp black, iron black, ultramarine, Nigrosine dye, Aniline Blue, Du Pont Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexylate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthol Red HFG, Lake Red C, Benzimidazolone Carmine HF3CS, Dioxazine Violet, Benzimidazolone Brown HFR Aniline Black, titanium oxide, Tartrazine Lake, Rhodamine 6G Lake, Methyl Violet Lake, Basic 6G Lake, Brilliant Green lakes, Hansa Yellow, Naphtol Yellow, Rhodamine B, Methylene Blue, Victoria Blue, Ultramarine Blue, and the like.

The MICR ink made with magnetic nanoparticles is a black or dark brown. The MICR ink according to the present disclosure may be produced as a colored ink by adding a colorant during ink preparation. Alternatively, a non-colored MICR ink (that is, free of added colorant) may be printed on a substrate during a first pass, followed by a second pass, wherein a colored ink that is lacking MICR particles is printed directly over the colored ink, so as to render the colored ink MICR-readable. In embodiments, the process herein can comprise (1) incorporating into an ink jet printing apparatus a phase change magnetic ink comprising a phase change ink carrier, an optional colorant, an optional dispersant, an optional synergist, an optional antioxidant; and a carbon coated magnetic nanoparticle comprising a magnetic core and a carbon shell disposed thereover; (2) melting the ink; and (3) causing droplets of the melted ink to be ejected in an imagewise pattern onto a substrate; (4) incorporating into an ink jet printing apparatus a phase change ink comprising a phase change ink carrier, a colorant, an optional dispersant, an optional synergist, and an optional antioxidant; (5) melting the ink; and (6) causing droplets of the melted ink of (5) to be ejected in an imagewise pattern onto a substrate, wherein the imagewise pattern covers the imagewise pattern of (3) such that the ink of (4) is rendered MICR-readable.

Antioxidant.

The inks of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Chemtura Corporation, Philadelphia, Pa., IRGANOX® 1010, commercially available from BASF, and the like. When present, the optional antioxidant is present in the ink in any desired or effective amount, such as from about 0.01 percent to about 20 percent by weight of the ink.

Viscosity Modifier.

The inks of the present disclosure can also optionally contain a viscosity modifier. Examples of suitable viscosity modifiers include aliphatic ketones, such as stearone, and the like, polymers such as polystyrene, polymethylmethacrylate, thickening agents, such as those available from BYK Chemie, and others. When present, the optional viscosity modifier is present in the ink in any desired or effective amount, such as from about 0.1 to about 99 percent by weight of the ink.

Other optional additives to the inks include clarifiers, tackifiers, such as FORAL® 85, a glycerol ester of hydrogenated abietic (rosin) acid (commercially available from Eastman), FORAL® 105, a pentaerythritol ester of hydroabietic (rosin) acid (commercially available from Eastman), CELLOLYN® 21, a hydroabietic (rosin) alcohol ester of phthalic acid (commercially available from Eastman), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Cray Valley), and the like; adhesives, such as VERSAMID® 757, 759, or 744 (commercially available from Cognix), plasticizers, such as UNIPLEX® 250 (commercially available from Uniplex), the phthalate ester plasticizers commercially available from Ferro under the trade name SANTICIZER®, such as dioctyl phthalate, diundecyl phthalate, alkylbenzyl phthalate (SANTICIZER® 278), triphenyl phosphate (commercially available from Ferro), KP-140®, a tributoxyethyl phosphate (commercially available from Chemtura Corporation), MORFLEX® 150, a dicyclohexyl phthalate (commercially available from Vertellus Specialties Inc.), trioctyl trimellitate (commercially available from Eastman Kodak Co.), and the like. Such additives can be included in conventional amounts for their usual purposes. The optional additives may be present in any suitable or desired amount, such as from about 0.1 to about 50 percent by weight of the ink.

In embodiments, the MICR phase change ink compositions herein have melting points of no lower than about 50° C. and no higher than about 150° C., although the melting point can be outside of these ranges.

In embodiments, the MICR phase change ink compositions herein have melt viscosities at the jetting temperature (in embodiments no lower than about 75° C. and no higher than about 140° C., although the jetting temperature can be outside of these ranges) of no more than about 25 centipoise or no less than about 2 centipoise, although the melt viscosity can be outside of these ranges.

The MICR phase change inks of the present disclosure can be employed in apparatus for direct printing ink jet processes and in indirect (offset) printing ink jet applications. Another embodiment of the present disclosure is directed to a process which comprises incorporating a MICR phase change ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final image receiving substrate, such as a final recording sheet. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, and the like. Phase change inks of the present disclosure can also be used in printing processes other than hot melt ink jet printing processes.

Any suitable substrate or recording sheet can be employed, including plain papers such as XEROX® 4200 papers, XEROX® Image Series papers, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Demonstration of fire hazard reduction with carbon coated nanoparticles. A bag of as received carbon coated iron nanoparticles, purchased from Nanoshel Corporation (Wilmington, Del., USA), having an average particle size of about 25 nanometers, was opened in a glove box which had first been inerted with Argon such that the oxygen and humidity levels were 5 ppm (parts per million) and 5 ppm, respectively, as a safety precaution. No overheating, (that is, proof of no significant oxidation) was observed. Then, a small amount of these particles were removed from the glove box and exposed to air: no fire was started. Larger amounts of these particles were then handled in air for magnetic phase change inks preparations.

Comparative Example 2

Counter example of fire hazard with uncoated metal nanoparticles.
Uncoated iron nanoparticles (50 nanometers average particle size) from MTI Corp. (Richmond, Calif., USA) were opened in a glove box similar to particles from Example 1. Even under these conditions they instantly became very hot. They were oxidized quickly by the traces of oxygen and water in the argon gas (about 5 ppm each) and essentially lost most of their magnetic remanence property. If opened in air, these pyrophoric materials would have ignited instantly.

Example 3

Magnetic ink preparation with carbon coated ferromagnetic nanoparticles—Ink as Attritate. Example 3.a Ink preparation by using stirring. A concentrate ink was prepared by adding 15 grams of carbon coated iron nanoparticles in air into 25.85 grams of Kemamide® S180 stearyl stearamide (aliphatic crystalline secondary amine, commercially available from Chemtura Corporation) melt at 140° C. containing 2.12 grams of Solsperse® 5000 (synergist agent available from Lubrizol Corporation) and 10.52 grams of Solsperse® 17000 (polymeric dispersant available from Lubrizol Corporation) mixed with an overhead stirrer. Stirring was performed for 2 hours to provide a concentrate ink. Then, a heated melt diluent composition (heated at 140° C.) was added to the liquid mixture previously made. The actual composition of the diluent is shown in Table 1.

TABLE 1

|  | Concentration (grams) | Diluent (grams) | Final Ink |
|---|---|---|---|
| Polyethylene Wax | 0.00 | 78.41 | 78.14 |
| Triamide Wax* | 0.00 | 17.94 | 17.94 |
| Kemamide® S180 | 25.85 | 0 | 25.85 |
| KE100® | 0.00 | 18.09 | 18.09 |
| Urethane Resin** | 0.00 | 2.49 | 2.49 |
| Naugard® 445 | 0.00 | 0.33 | 0.33 |
| Ink concentrate | 15 | 0.00 | 15.00 |
| Solsperse® 17000 | 10.52 | 0.00 | 10.52 |
| Solsperse® 5000 | 2.12 | 0.00 | 2.12 |
| Total | 53.49 | 117.26 | 170.75 |

*Triamide Wax as described in U.S. Pat. No. 6,860,930, which is hereby incorporated by reference herein in its entirety.
**a urethane resin that is the adduct of three equivalents of stearyl isocyanate and a glycerol-based alcohol, prepared as described in Example 4 of U.S. Pat. No. 6,309,453, which is hereby incorporated by reference herein in its entirety.

Example 3.b. Ink preparation by using an attritor and no intermediate concentrate ink. In order to aid in the de-agglomeration of carbon coated iron nanoparticles, it is convenient to use an attritor to form the actual usable ink. Into a Szegvari 01 attritor available from Union Process are charged 1800.0 grams of ⅛ inch diameter 440C Grade 25 steel balls available from Hoover Precision Products, Inc., having been first pre-cleaned in acetone then toluene to remove potential residual oils and greases and then dried in an oven heated at 120° C. to remove the solvents. The following components are added together and melt-mixed at 120° C. in a 600 milliliter beaker: 86.29 grams of a distilled polyethylene wax from Baker Petrolite, 19.74 grams of a triamide wax (triamide described in U.S. Pat. No. 6,860,930, which is hereby incorporated by reference herein in its entirety), 28.43 grams of Kemamide® S-180 (stearyl stearamide available commercially available from Chemtura Corporation), 19.91 grams of KE-100 Resin® (an ester of tetrahydroabietic acid and glycerol commercially available from Arakawa Corporation), 2.74 grams of urethane resin (as described in Example 4 of U.S. Pat. No. 6,309,453, which is hereby incorporated by reference herein in its entirety), 0.36 grams of Naugard® 445 (an antioxidant available from Crompton Corporation), and 3.78 grams of Solsperse® 17000 (polymeric dispersant available from Lubrizol Corporation). The resultant solution was quantitatively transferred to the attritor vessel containing the stainless steel balls. To the attritor vessel are added 0.76 grams of Solsperse® 5000 (synergist agent available from Lubrizol Corporation), where attrition of Solsperse® 5000 proceeds for 1 hour at 175 RPM. To this pigmented mixture is added 18 grams of iron nanoparticles, available from Nanoshel Corporation, and allowed to attrite overnight for 19 hours at 225 RPM upon which the resultant ink is subsequently discharged and separated from the steel balls in its molten state and then allowed to freeze.

Example 4

Magnetic ink preparation with carbon coated ferromagnetic nanoparticles—Concentrate as Attritate. In order to aid in the de-agglomeration of carbon-coated iron nanoparticles, it is convenient to use an attritor to form a concentrate and then an ink from that concentrate. Into a Szegvari 01 attritor available from Union Process are charged 1800.0 grams of ⅛ inch diameter 440C Grade 25 steel balls available from Hoover Precision Products, Inc., having been first pre-cleaned in acetone then toluene to remove potential residual oils and greases then dried in an oven heated at 120° C. to remove the solvents. The following components are added together and melt-mixed at 120° C. in a 600 milliliter beaker: 89.86 grams of Kemamide® S-180 (stearyl stearamide available commercially available from Chemtura Corporation) and 15.12 grams of Solsperse® 17000 (polymeric dispersant available from Lubrizol Corporation). After a homogeneous solution is obtained, the mixture is quantitatively transferred to the attritor vessel whereupon 3.02 grams of Solsperse® 5000 (synergist agent available from Lubrizol Corporation) are added. Attrition of Solsperse® 5000 proceeds for 1 hour at 175 RPM whereupon 72 grams of carbon-coated iron particles, available from Nanoshel Corporation, are added to the attritor vessel. The pigmented mixture is allowed to attrite overnight for 19 hours at 225 RPM upon which the resultant concentrate is subsequently discharged, separated from the steel balls in its molten state, and then allowed to freeze.

Example 5

Magnetic ink preparation with carbon coated ferromagnetic nanoparticles—Ink from Example 4. A magnetic ink is formed from the concentrate of Example 4 in the following manner. The following components are added together and melt-mixed at 120° C. in a 600 milliliter beaker to form Solution #1: 71.9 grams of a distilled polyethylene wax from Baker Petrolite, 16.45 grams of a triamide wax (triamide described in U.S. Pat. No. 6,860,930), 4.97 grams Kemamide® S-180 (stearyl stearamide available commercially available from Chemtura Corporation), 16.59 grams of KE-100® resin (an ester of tetrahydroabietic acid and glycerol commercially available from Arakawa Corporation), 2.28 grams of urethane resin (as described in Example 4 of U.S. Pat. No. 6,309,453), and 0.3 grams of Naugard® 445 (an antioxidant available from Chemtura Corporation). Into a 250 milliliter beaker is transferred 37.5 grams of the concentrate formed in Example 4, allowed to melt in an oven at 120° C., then transferred to a hot plate equipped with an overhead stirrer. The concentrate is stirred at low speed to avoid splashing as Solution #1 is slowly added. Additional stiffing continues at increased speed of 300 RPM for 2 hours wherein a magnetic ink is formed.

Example 6

Magnetic ink preparation with carbon coated ferromagnetic nanoparticles by using non-ionic dispersant. 10 g Unilin® 700 (a phase change base material comprising a saturated, long chain, linear primary alcohol, available commercially from Baker Petrolite) were melt by heating at 140° C. while stirred with an overhead stirrer. To this 0.50 grams of oleic acid (non-ionic dispersant) were added and stirring was continued for an additional 30 minutes to ensure formation of a homogeneous mixture. Then, 3 grams of carbon coated iron nanoparticles (average size of 25 nanometers, from Nanoshel Corp.) were added slowly. At the end of the addition, the mixture was stirred for 2 hours to ensure wetting of the nanoparticles. 70 grams of cleaned ⅛ inch diameter 440C Grade 25 steel balls available from Hoover Precision Products, Inc. were added in order to provide particles de-agglomeration. The mixture was stirred for 3 hours to provide a black composition.

Example 7

Magnetic property. All Examples 1-6 described above were carried out in air and no temperature increase or tendency to fire was detected during the preparation procedures. The inventive inks from the above examples were attracted by a magnet, which proves that they maintained their magnetic properties.

In various embodiments, magnetic phase change ink is provided which can be prepared by dispersing carbon coated metal magnetic nanoparticles in a phase change ink base. The process herein provides a process for preparation of MICR phase change ink that is scalable, safe, and non-pyrophoric. The MICR phase change ink can be used for various printing technologies, specifically phase change or solid ink printing technologies, and more specifically for magnetic security solid ink applications.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change magnetic ink comprising: a phase change ink carrier; an optional colorant; an optional dispersant; an optional synergist; an optional antioxidant; and a carbon coated magnetic nanoparticle comprising a magnetic core and a carbon shell disposed thereover; wherein the carbon shell comprising amorphous carbon, glassy carbon, graphite, and combinations thereof.

2. The phase change magnetic ink of claim 1, wherein the magnetic nanoparticles are ferromagnetic or superparamagnetic.

3. The phase change magnetic ink of claim 1, wherein the magnetic nanoparticles comprise a bimetallic or trimetallic core.

4. The phase change magnetic ink of claim 1, wherein the magnetic nanoparticles comprise a core selected from the group consisting of Fe, Mn, Co, Ni, FePt, CoPt, MnAl, MnBi, and mixtures and alloys thereof.

5. The phase change magnetic ink of claim 1, wherein the magnetic nanoparticles comprise a carbon shell having a thickness of from about 0.2 nanometers to about 100 nanometers.

6. The phase change magnetic ink of claim 1, wherein the magnetic nanoparticles have a volume average particle diameter of from about 3 to about 300 nanometers.

7. The phase change magnetic ink of claim 1, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

8. The phase change magnetic ink of claim 1, wherein the dispersant is selected from the group consisting of beta-hydroxy carboxylic acids and their esters, sorbitol esters with long chain aliphatic carboxylic acids, and combinations thereof.

9. The phase change magnetic ink of claim 1, wherein the magnetic core has a needle-like shape with an aspect ratio of about 3:2 to less than about 10:1.

10. The phase change magnetic ink of claim 1, wherein the magnetic nanoparticles have a magnetic saturation moment of about 20 emu/g to about 150 emu/g.

11. The phase change magnetic ink of claim 1, wherein the magnetic nanoparticles have a remanence of about 20 emu/gram to about 100 emu/gram.

12. The phase change magnetic ink of claim 1, wherein the colorant is carbon black.

13. A process for preparing a phase change magnetic ink comprising: combining a phase change ink carrier, an optional colorant, an optional dispersant, an optional synergist, an optional antioxidant, and a carbon coated magnetic nanoparticle comprising a magnetic core and a carbon shell disposed thereover; wherein the carbon shell comprising amorphous carbon, glassy carbon, graphite, and combinations thereof;

heating to provide a phase change magnetic ink including the metal nanoparticles; and optionally, filtering the phase change magnetic ink while in a liquid state, and cooling the phase change magnetic ink to a solid state.

14. The process of claim 13, wherein the magnetic nanoparticles comprise a bimetallic or trimetallic core.

15. The process of claim 13, wherein the magnetic nanoparticles comprise a core selected from the group consisting of Fe, Mn, Co, Ni, FePt, CoPt, MnAl, MnBi, and mixtures and alloys thereof.

16. The process of claim 13, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

17. A process which comprises:
(1) incorporating into an ink jet printing apparatus a phase change magnetic ink comprising a phase change ink carrier, an optional colorant, an optional dispersant, an optional synergist, an optional antioxidant; and a carbon coated magnetic nanoparticle comprising a magnetic core and a carbon shell disposed thereover; wherein the carbon shell comprising amorphous carbon, glassy carbon, graphite, and combinations thereof;
(2) melting the ink; and
(3) causing droplets of the melted ink to be ejected in an imagewise pattern onto a substrate.

18. The process of claim 17, comprising steps (1), (2), and (3), and further comprising:
(4) incorporating into an ink jet printing apparatus a phase change ink comprising a phase change ink carrier, a colorant, an optional dispersant, an optional synergist, and an optional antioxidant;
(5) melting the ink; and
(6) causing droplets of the melted ink of (5) to be ejected in an imagewise pattern onto a substrate, wherein the imagewise pattern covers the imagewise pattern of (3) such that the ink of (4) is rendered MICR-readable.

19. The process of claim 17, wherein the substrate is a final image receiving substrate.

* * * * *